United States Patent [19]

Peterson

[11] 3,837,235

[45] Sept. 24, 1974

[54] HYDROSTATIC TRANSMISSION CONTROL

[75] Inventor: Merle H. Peterson, Livonia, Mich.

[73] Assignee: Massey-Ferguson, Inc., Detroit, Mich.

[22] Filed: Feb. 12, 1973

[21] Appl. No.: 331,937

[52] U.S. Cl. .................................. 74/531, 192/4 B
[51] Int. Cl. ............................................. G05g 5/06
[58] Field of Search ............ 74/469, 470, 475, 531, 74/534, 527, 473; 188/74, 83

[56] References Cited
UNITED STATES PATENTS
773,812  11/1904  Russell................................ 74/475

*Primary Examiner*—Samuel Scott
*Assistant Examiner*—Frank H. McKenzie, Jr.
*Attorney, Agent, or Firm*—Robert L. Farris

[57] ABSTRACT

A hydrostatic transmission control has a nut-cracker-like mechanism for engaging the control to hold it in a selected speed position. The control is arranged so that movement of the control away from neutral toward a maximum forward speed moves the member engaged by the nut-cracker-like mechanism toward the pivot point of the same and thereby causing an increasing holding force to act to hold the same against movement.

5 Claims, 6 Drawing Figures

HYDROSTATIC TRANSMISSION CONTROL

This invention relates to a control for hydrostatic transmissions and more particularly to a control lever having means to hold the lever in any selected position.

Controls for hydrostatic transmissions normally include some lever means that acts through linkage to adjust the displacement of either the pump or the motor or both the pump and the motor of the transmission. In the type of transmission which utilizes an adjustable swash plate, the fluid pressure in the pump or motor cylinders acts on the swash plate itself and tends to return it to a neutral zero displacement condition. The greater the displacement the greater the force that acts on the swash plate to return it to neutral. Where an infinite speed control is desired it is not practical to detent the control to hold the selected pressure against the returning force and consequently, it is desirable to provide some means for continuously holding the control in a selected position and, preferably, to provide for an increasing holding force with increasing fluid displacement.

It is therefore an object of the invention to provide a manual control for a hydrostatic transmission wherein the control includes a braking or holding member to hold the control in a selected position.

It is a further object of the invention to provide a transmission control with a holding means wherein the holding force increases as the control means is moved toward faster speed condition.

These and other objects and advantages will be readily apparent from the following description and accompanying drawings, in which.

Figure 1:
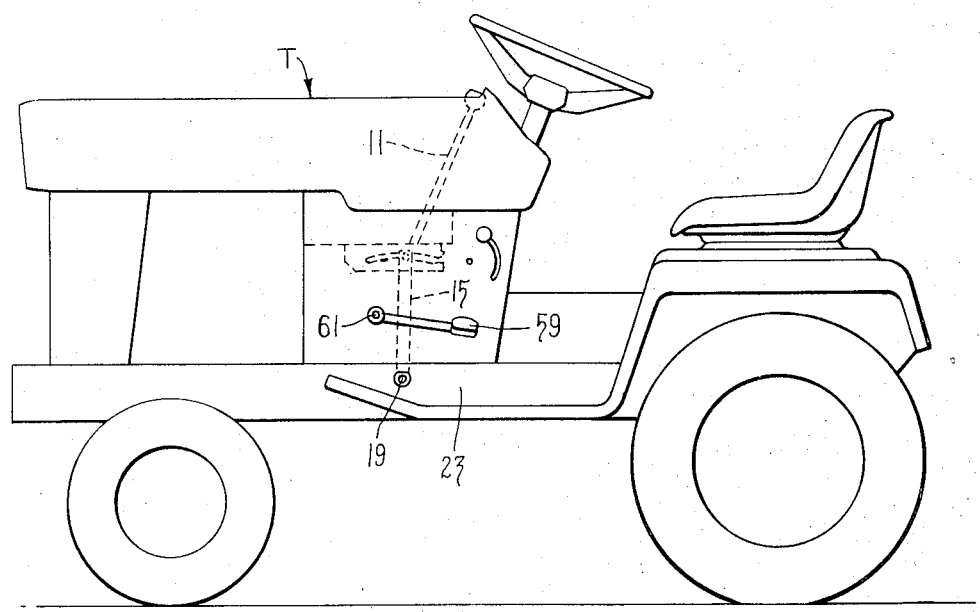
FIG. 1 shows the invention applied to a hydrostatic-type garden tractor.

Referring now to the illustrated embodiment of the invention, FIG. 1 shows a garden tractor generally indicated T in which a hand lever 11 is located on one side of the tractor and has a lower bent portion 13 secured to a lever 15 in turn secured to a hub 17 secured by a key to a shaft 19 that is journalled between members 21 and 23 of the tractor frame. Also secured by a key to the shaft 19 is a hub 25 that has formed thereon a lever arm 27 that extends downward from the hub.

Fastened by a clevis 29 to the arm 27 is one end of an adjustable length link generally indicated L and which includes a bent rod 31 and which extends through an eye formed in control link 33 that is secured to a hub 35 in turn secured to a shaft 37 that extends into the hydrostatic transmission (not shown) and is connected to vary the angle of the swash plate of the pump or motor of the transmission. Centering springs 39 and 41 extend between a fixed abutment 43 on the rod 31 and the member 33 and between an adjustable stop 45 and the member 33 respectively. An adjustment nut 47 acts to move the stop 45 relative to the rod 31 and thus change the relationship between the member 33 and the rod 31. This adjustment is desirable in order to provide an exact true neutral in the transmission that corresponds to a detented neutral of the transmission control.

Figure 4:
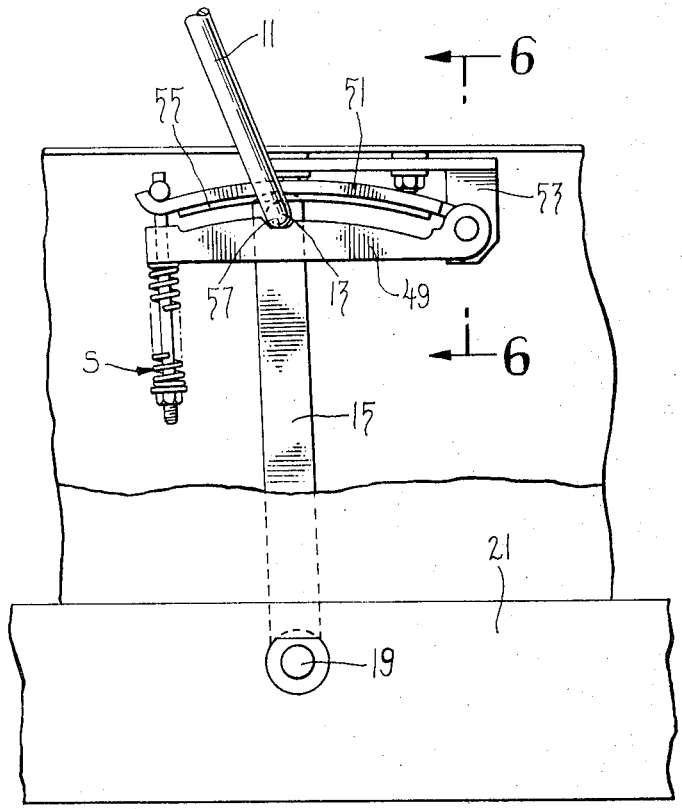
FIG. 4 is a right side sectional view taken on the lines 4—4 of FIG. 3.
Figure 5:
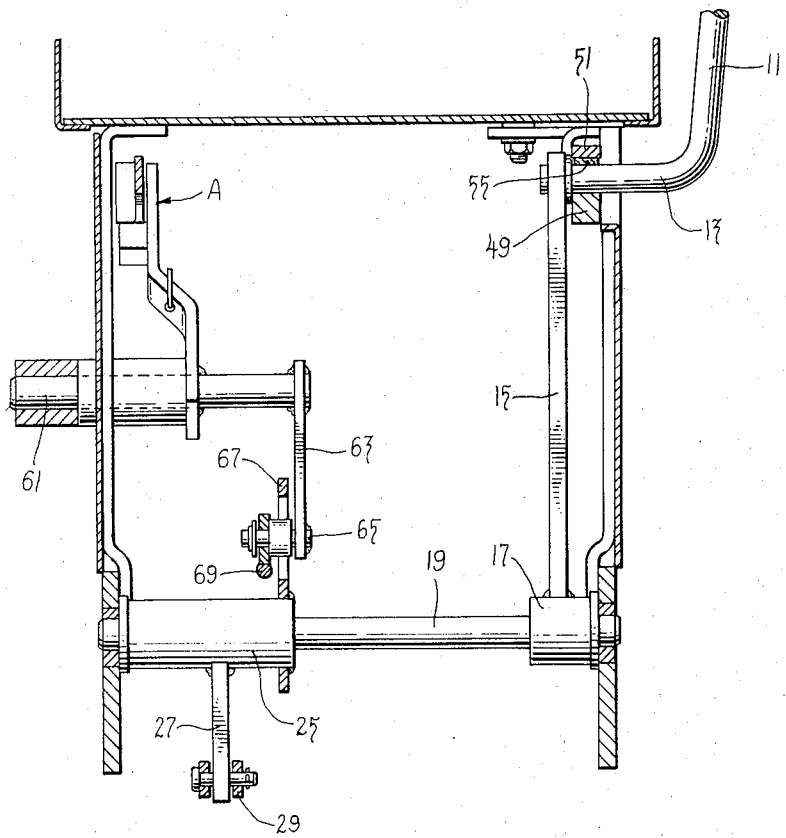
FIG. 5 is a sectional view taken on the line 5—5 of FIG. 2.
Figure 6:
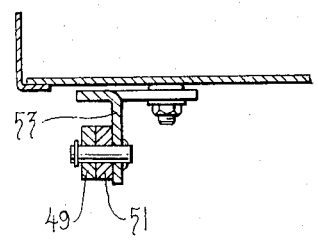
FIG. 6 is a sectional view taken on the line 6—6 of FIG. 4.

The means for holding or braking the control lever is best shown in FIG. 4. The brake consists of a nutcracker-like assembly including lower member 49 pivoted to upper member 51. The members 49 and 51 are supported at their pivot end on a bracket 53 as seen in FIGS. 4 and 6. The jaw members 49 and 51 are urged together by means of a spring assembly generally indicated S. The lower portion 13 of the lever 11 extends between the members 49 and 51 and is held against movement by frictional surface 55 located on the underside of the arcuate member 51. Detent notch 57 is formed on the top side of the convex surface of the lower jaw arm 49. This notch serves to hold the lever in a neutral position wherein a substantial effort is required to move the handle out of the notch against the force of the spring S. Once the portion 13 is moved out of the notch the portion 13 is still held in any position by the clamping effect between the members 49 and 51. Because the members 49 and 51 form a lever the clamping force between the same is greater when the portion 13 is closer to the pivot between the levers. The force extended by the spring is multiplied by the lever action. Thus as the lever is moved out of its neutral position shown in FIG. 4 toward the pivot the clamping force becomes greater and consequently as the handle is moved from the neutral to a faster forward speed position the clamping force becomes greater to resist the increasing reaction force on the control by the fluid in the transmission.

Figure 2:
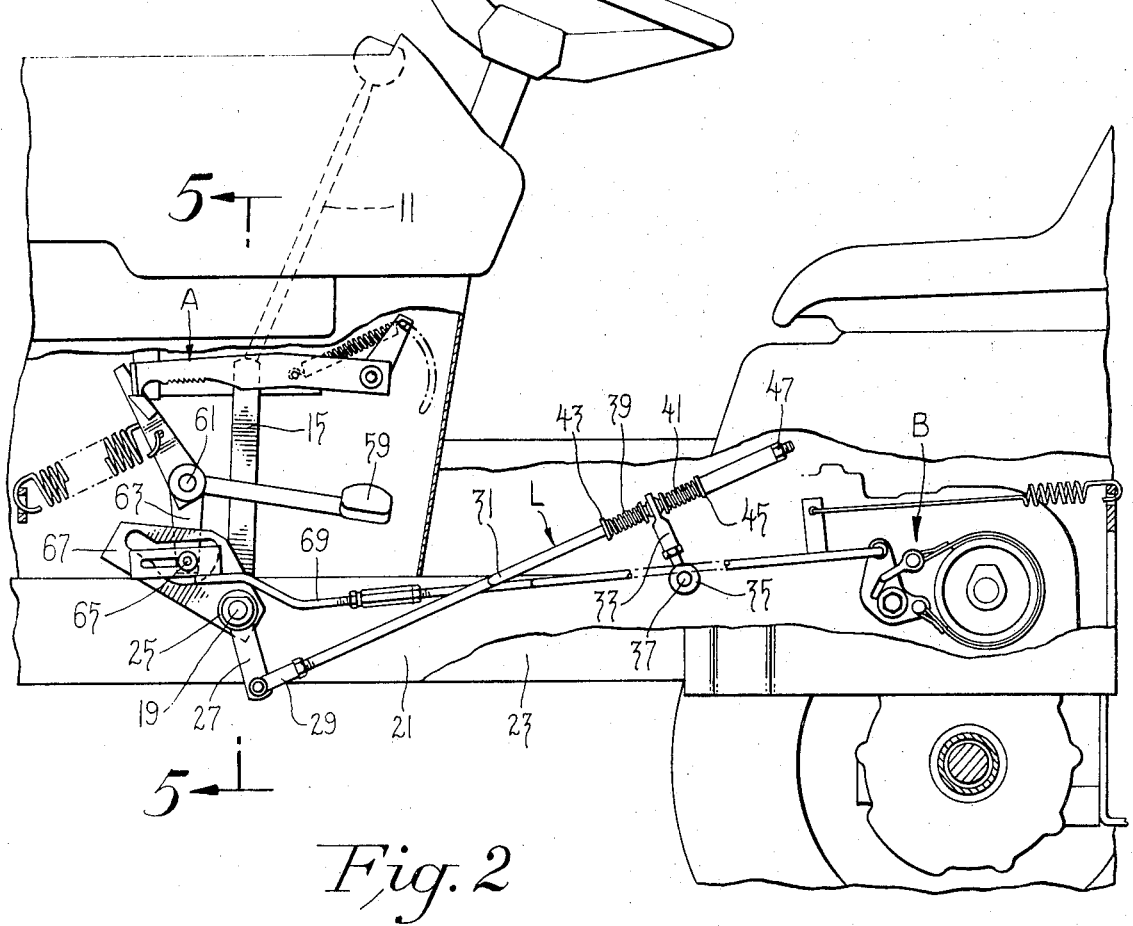
FIG. 2 is an enlarged view showing a portion of the control linkage for the hydrostatic transmission in the tractor of FIG. 1.
Figure 3:
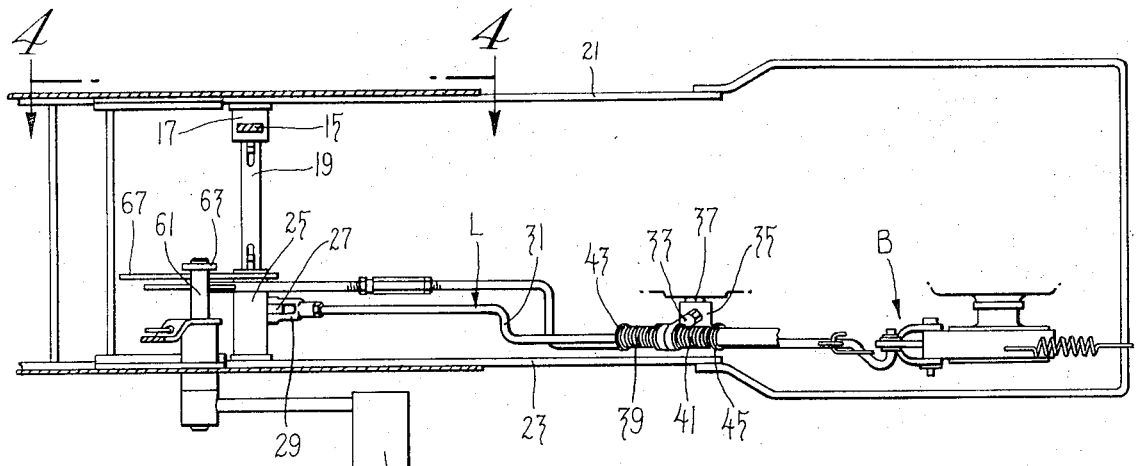
FIG. 3 is a plan view of the linkage in FIG. 2 with portions of the linkage broken away.

Also illustrated in the figures is a secondary means for moving the transmission control by means of a foot pedal 59 that is carried on a shaft 61 and which has a downwardly extending lever 63 having a pin 65 on the lower end that carries a bushing that extends through a cam slot in a member 67 that is secured at the hub 25. As the pedal 59 is depressed, the arm 63 is swung clockwise as shown in FIG. 2 and engages the cam surface on member 67 to rotate it clockwise and move the hub 25, lever 27 and rod 31 from whatever forward speed position the linkage may be in to the neutral position. Simultaneous movement of the foot pedal operates a linkage rod 69 which is connected to a brake assembly generally indicated B which forms no part of the invention. Brake lock assembly generally indicated A and which also forms no part of the invention acts to hold the brake pedal in a brake applied position.

It will be obvious that the control holding and braking means could be modified from that shown in the drawings and still come within the terms of the following claims.

I claim:

1. A control for a hydrostatic transmission having a speed setting element operable to establish the speed ratio in the transmission by varying the displacement of one of the hydraulic elements of the transmission, said speed setting element being urged by varying reaction forces in the transmission toward a neutral position providing a neutral speed in the transmission, control means connected to the speed setting element movable from a neutral position to a maximum forward drive position wherein said reaction forces are at a maximum, brake means acting on said control means to resist movement of the control means from a drive position toward said neutral position, and wherein said brake means provides a variable holding force on said control means that increases as the control means is moved toward its maximum forward drive position.

2. A control for a hydrostatic transmission having a speed setting element operable to establish the speed ratio in the transmission by varying the displacement of one of the hydraulic elements of the transmission, said speed setting element being urged by varying reaction forces in the transmission toward a neutral position providing a neutral speed in the transmission, control means connected to the speed setting element movable from a neutral position to a maximum forward drive position wherein said reaction forces are at a maximum, brake means acting on said control means to resist movement of the control means from a drive position toward said neutral position and wherein said control means comprises a lever swingable about an axis and said brake means includes a pair of spaced arcuate members enclosing a portion of the control means and further includes spring means urging one of said arcuate members toward the other, at least one of said arcuate members having a friction surface in contact with said portion.

3. The control of claim 2 wherein said movable arcuate member is pivoted at one end of the other arcuate member and wherein the arcuate members form a pair of "nutcracker" jaws and wherein said spring means acts to move said jaws together, the pivotal connection between the arcuate members being adjacent to the maximum drive position of the lever wherein the braking force exerted by the jaws on the lever portion is at a maximum.

4. The control of claim 3 wherein a neutral detent notch is provided in one of the arcuate members to locate and hold the lever in a predetermined position.

5. The control of claim 4 wherein said control means is connected to the speed setting element through an adjustable length linkage whereby the exact setting of the control means can be established corresponding to the exact neutral position of the speed setting member.

* * * * *